United States Patent
Adas et al.

(10) Patent No.: US 8,277,213 B2
(45) Date of Patent: Oct. 2, 2012

(54) APPARATUS FOR INJECTION MOLDING

(75) Inventors: James Oliver Adas, Clinton Township, MI (US); Trevor Pruden, Windsor (CA); Craig Vincent Kovacic, Imlay City, MI (US)

(73) Assignee: DME Company LLC, Madison Heights, MI (US)

( * ) Notice: Subject to any disclaimer, the term of this patent is extended or adjusted under 35 U.S.C. 154(b) by 76 days.

(21) Appl. No.: 12/971,277

(22) Filed: Dec. 17, 2010

(65) Prior Publication Data

US 2012/0156322 A1    Jun. 21, 2012

(51) Int. Cl.
*B29C 45/20* (2006.01)
(52) U.S. Cl. ......................... 425/549; 425/562; 425/572
(58) Field of Classification Search ................... 425/549, 425/562, 572
See application file for complete search history.

(56) References Cited

U.S. PATENT DOCUMENTS

| | | | |
|---|---|---|---|
| 4,468,191 A * | 8/1984 | Gellert | 425/564 |
| 5,269,677 A | 12/1993 | Gauler | |
| 6,162,043 A | 12/2000 | Gellert | |
| 6,220,851 B1 | 4/2001 | Jenko | |
| 6,379,144 B1 * | 4/2002 | Wright | 425/562 |
| 6,890,473 B2 | 5/2005 | Ho et al. | |
| 7,314,367 B2 | 1/2008 | Fairy | |
| 2006/0228440 A1 * | 10/2006 | Ernich | 425/549 |

OTHER PUBLICATIONS

Webster's Ninth New Collegiate Dictionary, 1986, p. 1006.*
DME Company, Quick Reference Guide DME Stellar 5000 Hot Runner Systems, 2010, Published by DME Company, Madison Heights, MI, USA; Relevance: outline drawings at pp. 8, 10 and 11 illustrate retention of nozzles with manifolds by retaining nuts engaging nozzle bodies and engaging threads of the manifolds, the illustrated constructions were available more than one year before filing of the subject application.

* cited by examiner

*Primary Examiner* — Tim Heitbrink
(74) *Attorney, Agent, or Firm* — John W. Gregg (57) ABSTRACT

An adaptor bushing for an injection molding apparatus comprising a manifold, a nozzle assembly and a nozzle retention device, comprises: (i) a bushing passage for fluid communication between a passage of the manifold and a nozzle passage; (ii) at least one transition region joining portions of the bushing passage; and, (iii) at least one alignment surface effective to (a) align longitudinal centerlines of the bushing passage, manifold passage and nozzle passage and (b) eliminate or reduce relative tilt of the adaptor bushing, nozzle assembly and manifold so that with the adaptor bushing clamped between the manifold and nozzle assembly, leakage of material at the interfaces of the bushing passage with the manifold passage and nozzle passage is eliminated or reduced to an acceptable level under normal operating conditions. A manifold and nozzle assembly construction comprises an adaptor bushing interposed between a manifold passage and a nozzle passage.

20 Claims, 8 Drawing Sheets

APPARATUS FOR INJECTION MOLDING

BACKGROUND OF THE INVENTION

1. Field of the Invention

This invention relates generally to injection molding. In particular, this invention relates to so-called hot runner constructions comprising manifold and nozzle assemblies for conducting flow of melt from an injection unit to one or more mold cavities.

2. Description of Related Art

It is known to provide injection molding equipment comprising constructions of a manifold and associated nozzle assemblies where nozzle assemblies are connected to a material distributing manifold member by engagement of threads of a body of a nozzle with threads of the manifold member. Alternative arrangements provide for connection of a nozzle assembly to a manifold member by a threaded member (nut) engaging threads of the manifold member and engaging a retention element of a nozzle body so as to clamp the nozzle to the manifold member.

In the known constructions of manifold and nozzle assemblies, melt passages of the nozzle assemblies are in direct communication with melt passages of the manifold. A manifold member is required that is peculiar for each size of nozzle melt passage to be used. That is, because of the direct communication between melt passages of nozzle assemblies and the manifold melt passages, it is not possible to substitute nozzle assemblies having nozzle passages of different cross-sectional sizes one for another for attachment to a particular manifold member. Because it is desirable to select nozzles according to material being processed and characteristics of mold cavities, it is desirable to substitute nozzles one for another in constructions of manifold members and nozzle assemblies.

Appropriate alignment of nozzle assemblies with material distributing manifold members is required to enable unimpeded flow of material from a manifold passage into a nozzle passage and to prevent leakage at the interface between a nozzle assembly melt passage and a manifold member melt passage. It is known to achieve the desired alignment by direct contact of an alignment surface of the manifold member with a surface of the nozzle body or retention device.

In general, known methods of threaded engagement for retention of nozzles with manifold members are not effective to accommodate differences between cross sectional size of a manifold passage outlet and a nozzle passage inlet. As a consequence of this deficiency of known constructions, it is necessary to provide manifold members made to accommodate particular nozzles. Therefore, nozzles having differing nozzle passage cross sectional sizes can not be substituted one for another in such manifold and nozzle assembly constructions. Hence, there remains a need for improved constructions for retention of nozzles with manifold members to accommodate substitution of nozzle assemblies of differing melt passage cross-sectional size while achieving desired alignment of melt passages of nozzle assemblies with melt passages of manifold members so as to facilitate flow of material from the manifold passage into the nozzle passage and eliminate or reduce to an acceptable level leakage of material as it is conveyed from a manifold passage into a nozzle passage.

SUMMARY OF THE INVENTION

It is an object of the present invention to provide an adaptor bushing for an injection molding apparatus comprising a material distributing manifold, at least one nozzle assembly and at least one nozzle retention device effective to clamp an adaptor bushing between the manifold and a nozzle assembly, the adaptor bushing comprising: a bushing passage for fluid communication between a communicating passage comprising a passage of the material distributing manifold and a nozzle passage comprising a nozzle assembly; at least one transition region joining portions of the bushing passage; and, at least one alignment surface effective for achieving alignment of the adaptor bushing to effect concentricity of the inlet and outlet of the bushing passage with, respectively, the outlet of the communicating passage and the inlet of the nozzle passage and to eliminate, or reduce to an acceptable extent, leakage of material at the bushing passage inlet and outlet interfaces with, respectively the communicating passage and nozzle passage under normal operating conditions.

It is a further object of the present invention to provide an apparatus for injection molding comprising at least one manifold member comprising at least one manifold passage for conveying material in a flowable condition supplied from an injection unit; at least one nozzle assembly comprising a nozzle body having a nozzle passage there through for conveying material in a flowable condition received from a manifold to an inlet of a mold cavity; at least one retention device for retaining a nozzle assembly with the manifold member; and, an adaptor bushing having a bushing passage in fluid communication with the manifold passage and the nozzle passage and being clamped between the manifold member and a nozzle assembly by a retention device.

Further objects and advantages of the invention shall be made apparent from the accompanying drawings and the following description thereof.

In accordance with the aforesaid objects the present invention provides an adaptor bushing for an injection molding apparatus comprising a material distributing manifold, at least one nozzle assembly and at least one nozzle retention device effective to clamp the adaptor bushing between the manifold and the nozzle assembly, the adaptor bushing comprising a bushing passage there through, at least one transition region joining portions of the bushing passage and at least one alignment surface effective for achieving alignment of the adaptor bushing to effect concentricity of the inlet and outlet of bushing passage with, respectively, a communicating passage outlet comprising the manifold and a nozzle passage inlet comprising the nozzle assembly and to eliminate, or reduce to an acceptable extent, leakage of material at the bushing passage inlet and outlet interfaces with, respectively the communicating passage and nozzle passage under normal operating conditions. The invention further provides an apparatus for injection molding comprising at least one manifold member comprising at least one manifold passage for conveying material in a flowable condition supplied from an injection unit; at least one nozzle assembly comprising a nozzle body having a nozzle passage there through for conveying material in a flowable condition received from a manifold to an inlet of a mold cavity, the nozzle passage joining a nozzle inlet with a nozzle outlet; a retention device for retaining the nozzle assembly with the manifold member; and, an adaptor bushing interposed between the manifold member and a nozzle assembly and comprising a bushing passage there through in fluid communication with a manifold passage and a nozzle passage, each adaptor bushing being clamped between the manifold member and a nozzle assembly by a retention device. The adaptor bushing of the apparatus further comprises at least one alignment surface effective for achieving alignment of the adaptor bushing to effect concentricity of the bushing passage inlet and outlet with, respectively, the outlet of the manifold passage and the inlet of the nozzle passage and to eliminate, or reduce to an acceptable extent, leakage of material at the bushing passage inlet and outlet interfaces with, respectively the manifold passage and nozzle passage under normal operating conditions. Alternative embodiments of retention devices and adaptor bushings are provided for alternative arrangements of alignment surfaces of the adaptor bushing, manifold member and retention device.

DETAILED DESCRIPTION OF THE PREFERRED EMBODIMENT

The invention shall be described with reference to preferred embodiments which shall be shown and described in detail. It is not the intention of applicant that the invention be limited to the preferred embodiments, but rather that the invention shall be defined by the appended claims and all equivalents thereof.

Figure 1:
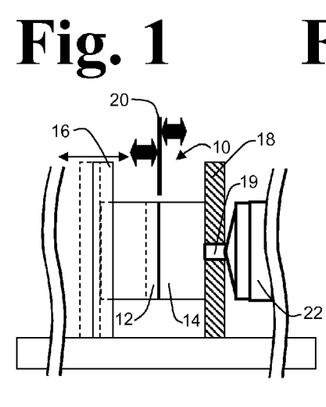
FIG. 1 is a partial cross sectional view of an injection molding clamp and injection unit for molding articles from material supplied from the injection unit to cavities defined by members of a mold assembly.

Referring to FIG. 1, a mold assembly 10 comprises a primary core component 12 and a primary cavity component 14. Primary core component 12 is supported by movable platen 16, and primary cavity component 14 is supported by stationary platen 18. Mold assembly 10 has parting line 20 and the primary cavity component 14 and primary core component 12 define at least one mold cavity (not shown) when the mold components are engaged, i.e., when the mold assembly is "closed". Articles are produced by: (i) filling the mold cavities with material in flowable condition, so-called "melt"; (ii) allowing the melt to solidify; and, (iii) with the mold components separated, i.e., "open", removing the molded articles. Movable platen 16 and stationary platen 18 comprise a press unit of an injection molding machine. Movable platen 16 is moved to open and close mold assembly 10, an open position of movable paten 16 being shown in phantom (dashed line) in FIG. 1. Melt is injected to mold assembly 10 from a nozzle such as nozzle 19 of an injection unit 22, the nozzle passing through an opening of stationary platen 18 as illustrated by the cross-section thereof shown in FIG. 1. Distribution of melt to the mold cavities is advantageously effected by a configuration of conduits and nozzles (not shown in FIG. 1) receiving melt from nozzle 19 and conveying melt through the nozzles to the mold cavities. Primary core component 12 may advantageously comprise a sub-assembly of members providing support for a core mold die as well as a mechanism and components to dislodge molded articles from the core mold die. Primary cavity component 14 may advantageously comprise a sub-assembly of members providing support for a cavity mold die as well as constructions for conveying melt from injection unit 22 to the mold cavities. Such constructions may advantageously comprise one or more manifold and nozzle assembly constructions effective to distribute melt in a flowable condition at pressures adequate to achieve expeditious and complete filling of the mold cavities.

Figure 2:
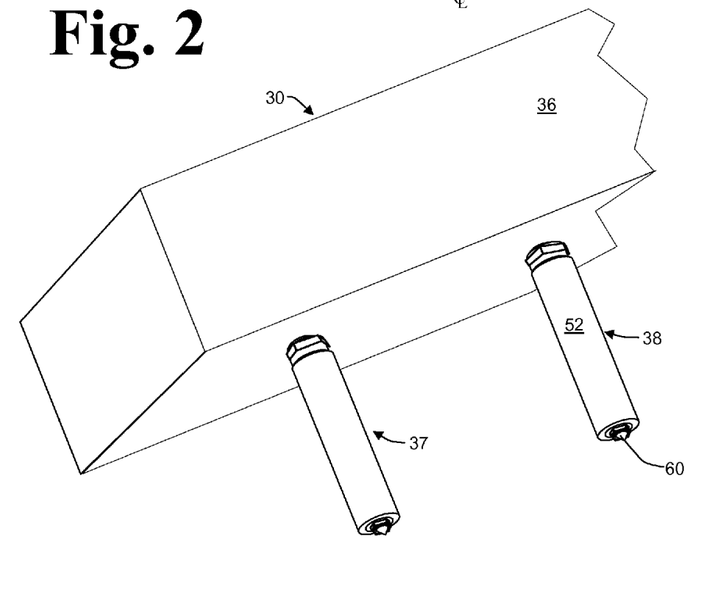
FIG. 2 is a three dimensional view of a construction of a manifold and nozzle assemblies in accordance with the invention.
Figure 3:
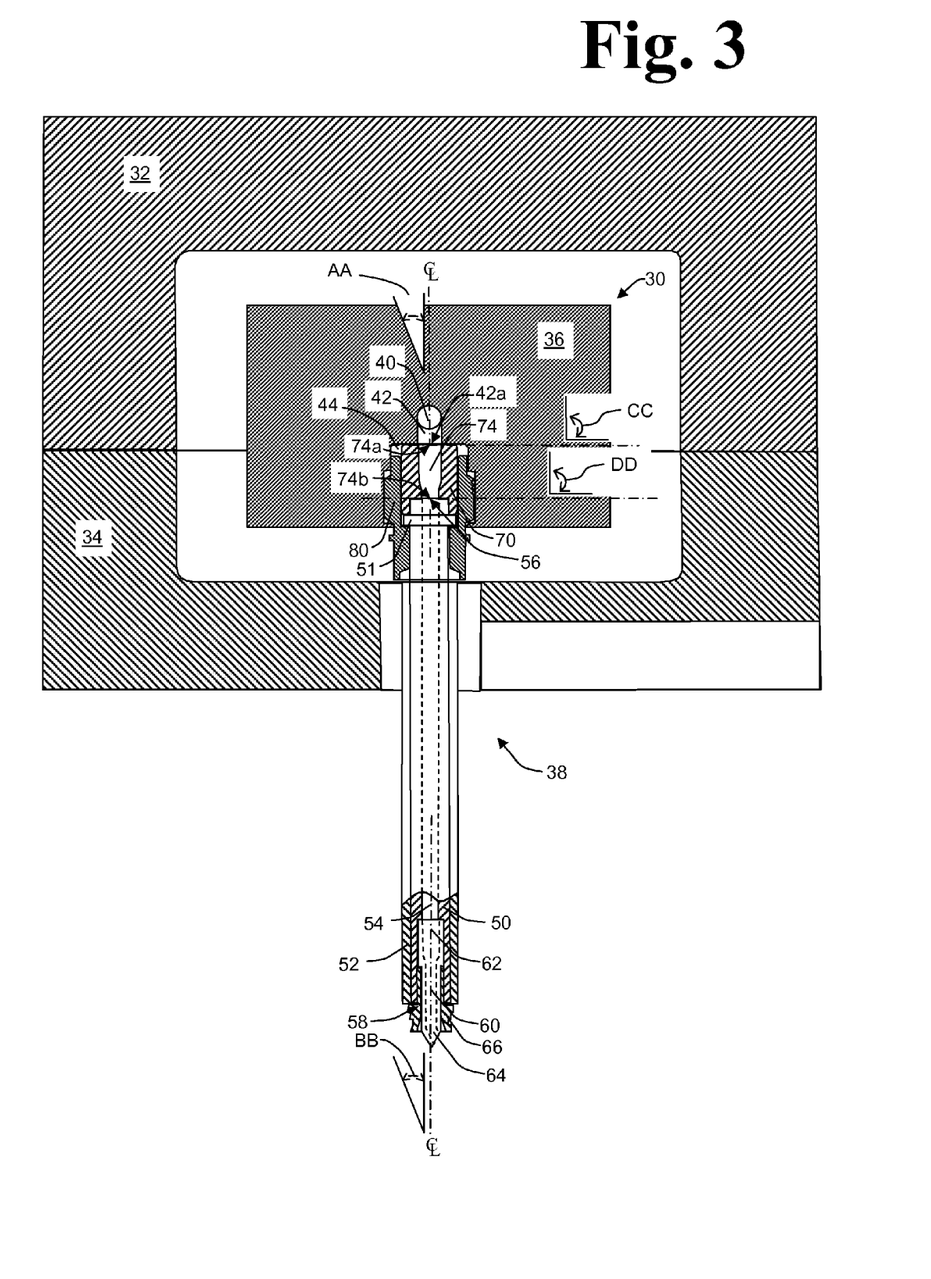
FIG. 3 is a partial cross sectional view depicting an arrangement of a manifold, adaptor bushing, nozzle assembly and retention device in accordance with the invention.

A manifold and nozzle assembly construction 30 in accordance with the invention is shown in FIGS. 2 and 3. Advantageously, manifold and nozzle assembly construction 30 is received within a mold assembly member such as mold assembly member 14 of FIG. 1 comprising a manifold retention member such as manifold retainer plate 32 (FIG. 3) and a nozzle retainer member such as nozzle plate 34 (FIG. 3). Manifold and nozzle assembly construction 30 comprises a manifold member such as manifold block 36, and at least one nozzle assembly such as nozzle assemblies 37 and 38. Manifold block 36 receives melt from injection unit 22 and conveys melt through one or more internal manifold passages in fluid communication with nozzle assemblies attached to manifold block 36. Nozzle assemblies are advantageously attached to and retained with manifold block 36 by retention devices, each retention device engaging a nozzle assembly and the manifold block so as to achieve sealing contact between the nozzle assembly and the manifold block to prevent leakage of material at the interface between the two. To this end, it is necessary that the inlet of the nozzle and the complementary outlet of the manifold be aligned and that opposed surfaces surrounding the manifold outlet and nozzle inlet achieve sufficient contact to prevent leakage of material under normal operating temperatures and pressures.

Continuing with reference to FIG. 3, melt enters manifold block 36 at an inlet (not shown) and is conveyed through manifold passage 40 to communicating passages such as communicating passage 42 for supply to nozzle assemblies such as nozzle assembly 38. Nozzle assembly 38 advantageously comprises an elongated cylindrical body such as nozzle body 50 through which melt passage 54 communicates with a nozzle inlet 56 and a nozzle outlet 58. Nozzle body 50 comprises a retention element such as external flange 51 defining a shoulder for engagement with a shoulder of a nozzle retention device such as retaining nut 80. Advantageously, the inlet end of nozzle body 50 projects beyond the external flange 51. Manifold block 36 comprises cylindrical receiving bores such as receiving bore 44 for receiving the inlet end of nozzle body 50. Each communicating passage terminates at a cylindrical receiving bore as illustrated by outlet 42a of communicating passage 42 at the ceiling of receiving bore 44. To further advantage, a heating element such as heater 52 surrounds nozzle body 50 and is effective to maintain melt within nozzle passage 54 in a flowable condition. To still further advantage, an exit tip such as needle tip 60 is fitted to the outlet end of nozzle body 50 and comprises a tip passage 62 in fluid communication with nozzle passage 54 and tip outlet 64. Advantageously, needle tip 60 is retained in the outlet end of nozzle body 50 by a tip retainer such as tip retaining nut 66 threadably engaged with nozzle body 50.

To accommodate fitting nozzle assemblies such as nozzle assembly 38 of differing sizes and, in particular, having nozzle passages of differing cross sectional sizes, to manifold and nozzle assembly construction 30, an adaptor bushing such as adaptor bushing 70 is interposed between manifold block 36 and nozzle assembly 38 retained with manifold block 36 by a retention device such as nozzle retaining nut 80. Adaptor bushing 70 receives melt from manifold passage 40 through communicating passage 42 at bushing inlet 74a. Melt is conveyed through bushing passage 74 to bushing outlet 74b and into a nozzle inlet such as nozzle inlet 56. It will be appreciated that irrespective of the cross sectional size of the nozzle passage 74, in order to convey melt from manifold block 36 into bushing passage 74 without impediment from bushing passage 74 it is necessary for cross sectional size of bushing inlet 74a to be no smaller than the cross sectional size of outlet 42a of communicating passage 42 and for bushing inlet 74a to be concentric with communicating passage outlet 42a. Likewise, in order to convey melt from adaptor bushing 70 into nozzle assembly 38 without impediment at the interface of the two, it is necessary that bushing outlet 74b have a cross sectional size no greater than the cross sectional size of nozzle inlet 56 and for nozzle inlet 56 to be concentric with bushing outlet 74b. Hence, cross sectional sizes of the bushing inlet 74a and outlet 74b of bushing passage 74 are selected according to the cross sectional sizes of the communicating passage outlet 42a of a particular manifold and the cross sectional size of nozzle inlet 56 of a selected nozzle, respectively.

With a suitably dimensioned bushing inlet 74a, unimpeded flow of material from communicating passage 42 into bushing passage 74 is achieved by concentricity of bushing inlet 74a with communicating passage outlet 42a. With suitably dimensioned bushing outlet 74b, unimpeded flow of material from bushing passage 74 into nozzle passage 54 is achieved by concentricity of bushing passage outlet 74b with nozzle passage inlet 56. Said concentric dispositions are achieved when the longitudinal centerline of bushing passage 74 is substantially parallel to and aligned with the longitudinal centerlines of communicating passage 42 and nozzle passage 54. Such alignment of centerlines is achieved by reliance on alignment of the longitudinal centerline of bushing passage 74 with the longitudinal centerline of adaptor bushing 70, alignment of the longitudinal centerline of nozzle passage 54 with the longitudinal centerline of nozzle body 50, and contact of alignment surfaces effective to align bushing body 71 and nozzle body 50 relative to the longitudinal centerline of communicating passage 42.

Flow of material from communicating passage 42 into nozzle passage 54 without leakage at the interfaces of bushing passage 74 with communicating passage 42 and nozzle passage 54 is achieved by sealing contact of opposed surfaces surrounding bushing inlet 74a and surrounding communicating passage outlet 42a and by sealing contact of opposed surfaces surrounding bushing outlet 74b and surrounding nozzle inlet 56. Such surrounding surfaces are advantageously substantially flat and substantially perpendicular to the longitudinal centerlines of, as applicable, communicating passage 42, bushing passage 74 and nozzle passage 54, the perpendicularity being illustrated by angles CC and DD of FIG. 3. Sealing contact between bushing body 71, manifold block 36 and nozzle body 50 is facilitated by elimination of tilt of the longitudinal centerline of bushing body 71 relative to the longitudinal centerlines of communicating passage 42 and nozzle passage 54, relative tilt of the longitudinal centerlines being illustrated by the angles AA and BB of FIG. 3. Desired alignment of bushing inlet 74a with the communicating passage outlet 42a is achieved by establishing substantial parallelism and alignment of the longitudinal centerlines of communicating passage 42 and bushing passage 74. Desired alignment of the outlet 74b of bushing passage 74 with nozzle inlet 56 is achieved by establishing substantial parallelism and alignment of the longitudinal centerlines of bushing passage 74 and nozzle passage 54. The desired substantial parallelism of longitudinal centerlines is effective to eliminate, or reduce to an acceptable extent, tilt of adaptor bushing 70 relative to the ceiling of receiving bore 44 so as to facilitate sealing contact of a bushing end face with the ceiling of receiving bore 44 and tilt of adaptor bushing 70 and nozzle body 50 relative to each other so as to facilitate sealing contact between an end face of adaptor bushing 70 surrounding bushing passage outlet 74b with the end face of nozzle body 50 surrounding nozzle inlet 56.

While cross sectional size of bushing passage 74 may be constant, in order to accommodate a difference in cross-sectional sizes of communicating passage outlet 42a and nozzle inlet 56, bushing passage 74 advantageously includes at least one transition region 74c (FIGS. 10a-10c) defining a transition in cross sectional size between the cross sectional size of bushing inlet 74a and the cross sectional size of bushing outlet 74b, such as the transition region illustrated in FIG. 3. It will be understood that use of such adaptor bushings permits use of a single manifold in combination with nozzles of differing nozzle passage cross sectional sizes within a range accommodated by such adaptor bushings. The use of such adaptor bushings is effective to reduce the number of manifold blocks that would otherwise be necessitated by selection of nozzles having nozzle passages of differing cross sectional sizes.

Figure 4A:
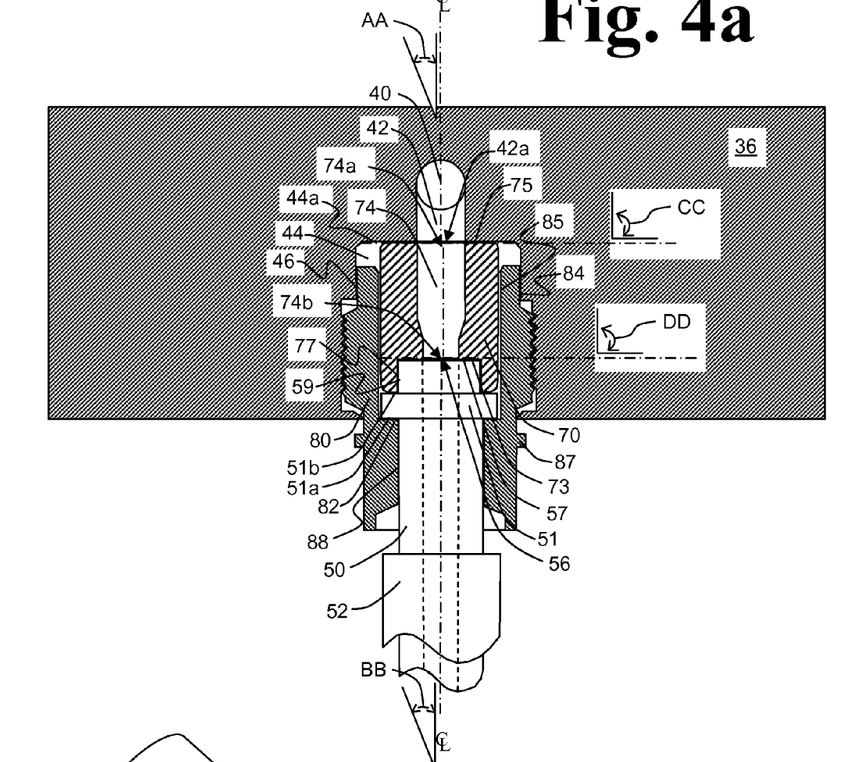
FIGS. 4a and 4b are enlarged partial cross sectional views of the adaptor bushing, and retention device of FIG. 3.
Figure 4B:
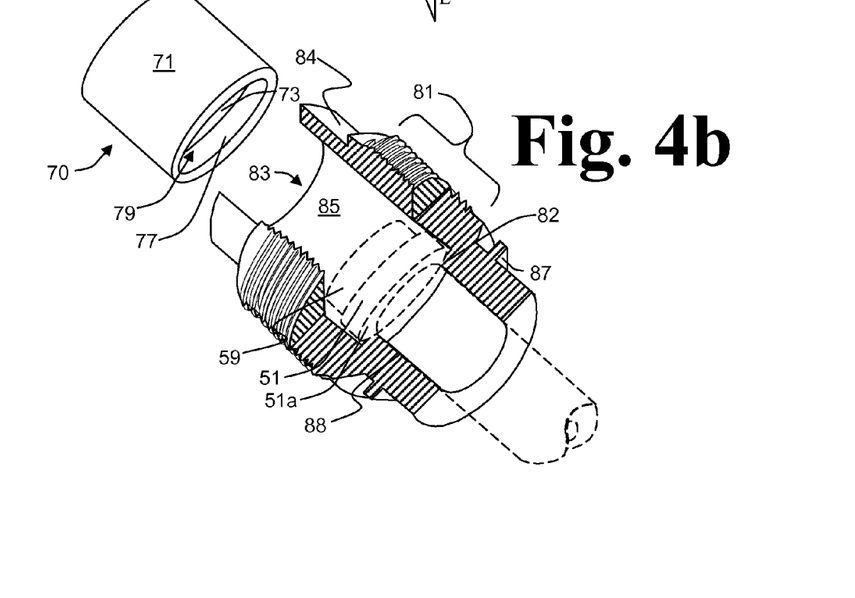
Figures 5A, 5B:
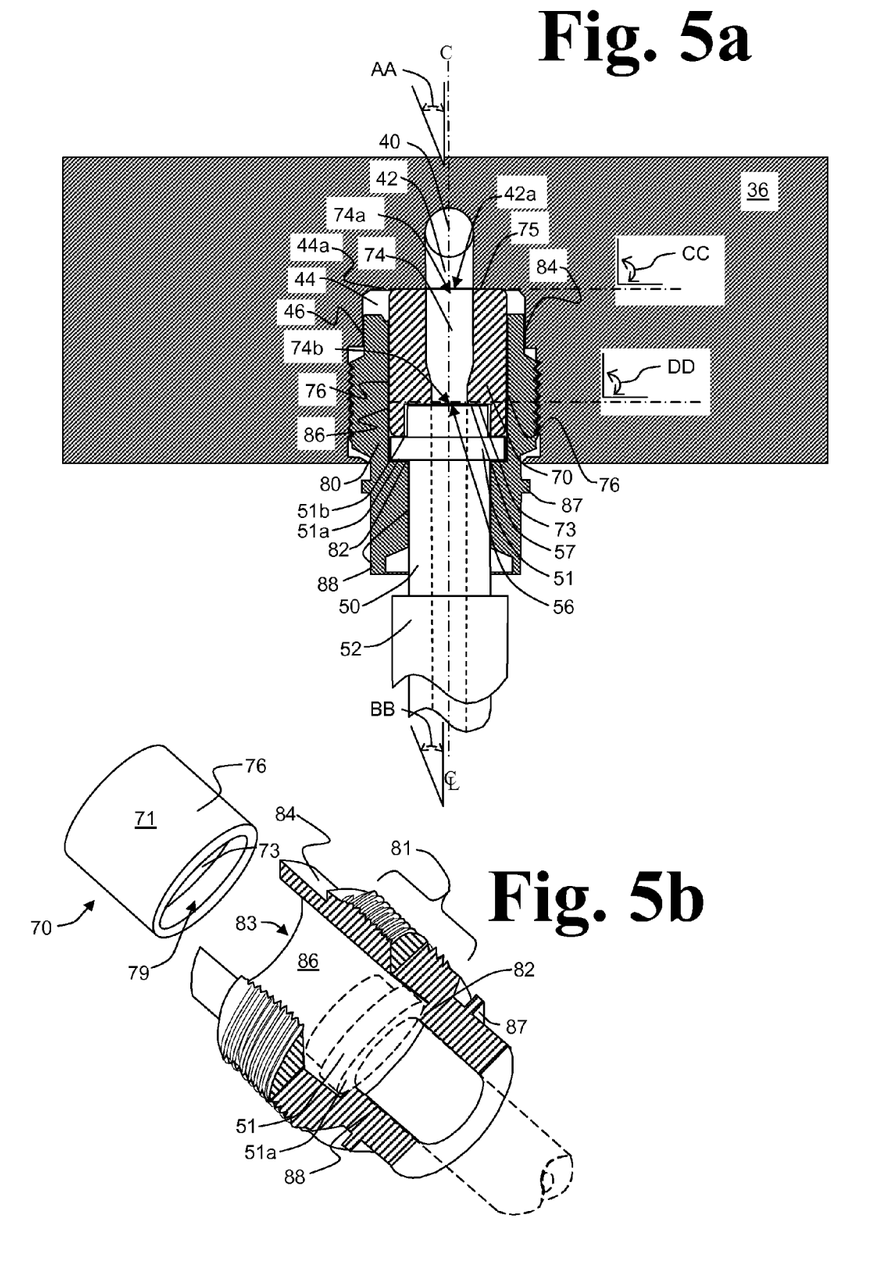
FIGS. 5a and 5b are enlarged partial cross sectional views of an alternative of the adaptor bushing and retention device of FIG. 3.
Figures 6A, 6B:
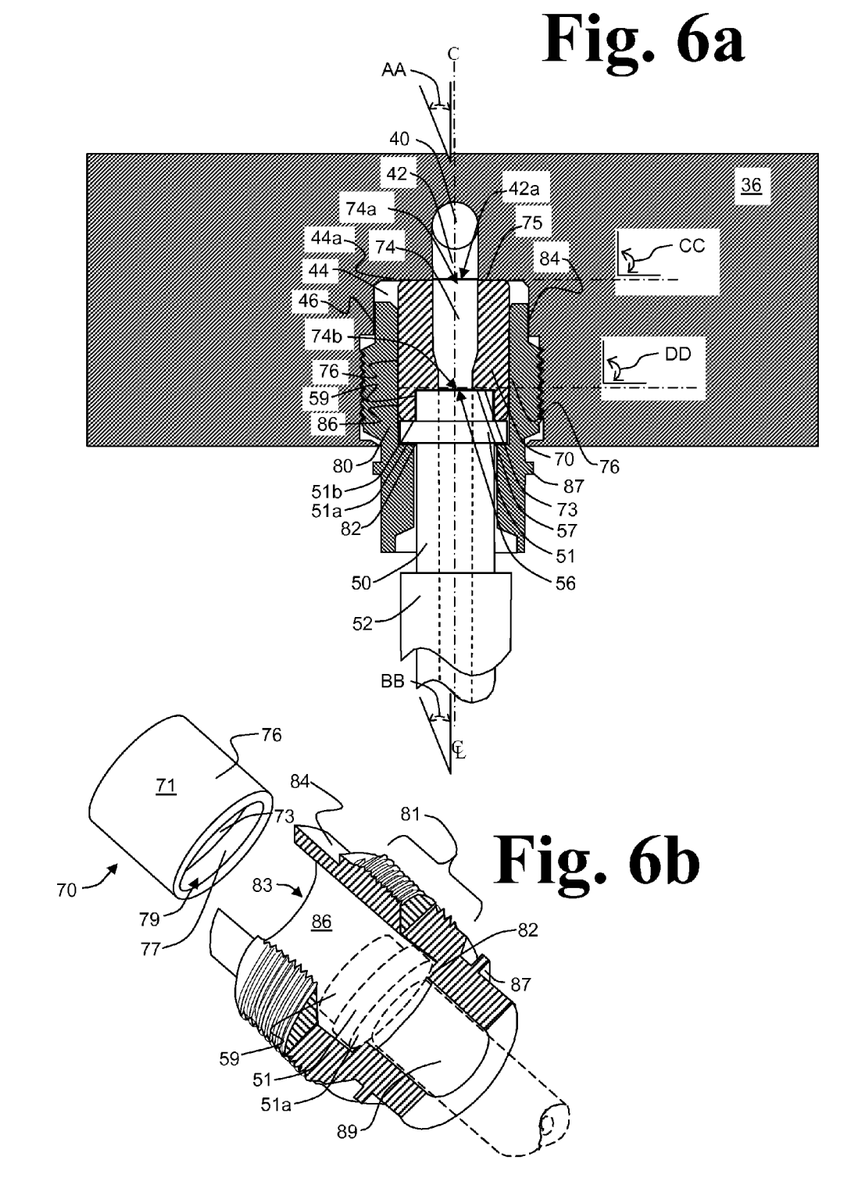
FIGS. 6a and 6b are enlarged partial cross sectional views of an alternative of the adaptor bushing and retention device of FIG. 3.
Figure 7A:
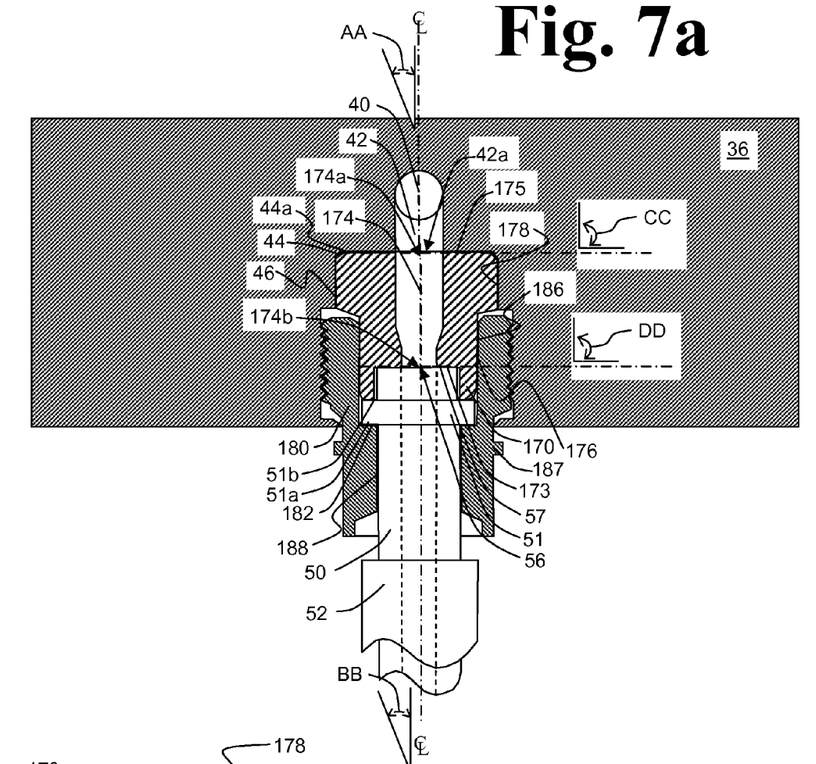
FIGS. 7a and 7b are enlarged partial cross sectional views of an alternative of the adaptor bushing and retention device in accordance with the invention.
Figure 7B:
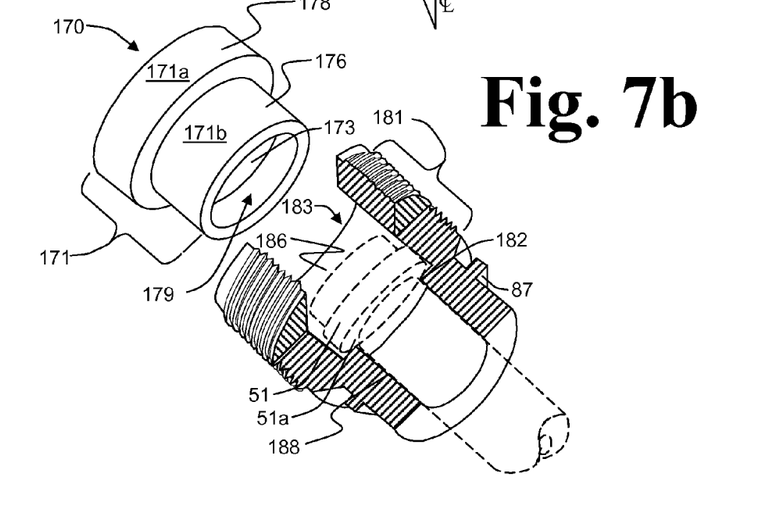
Figure 8A:
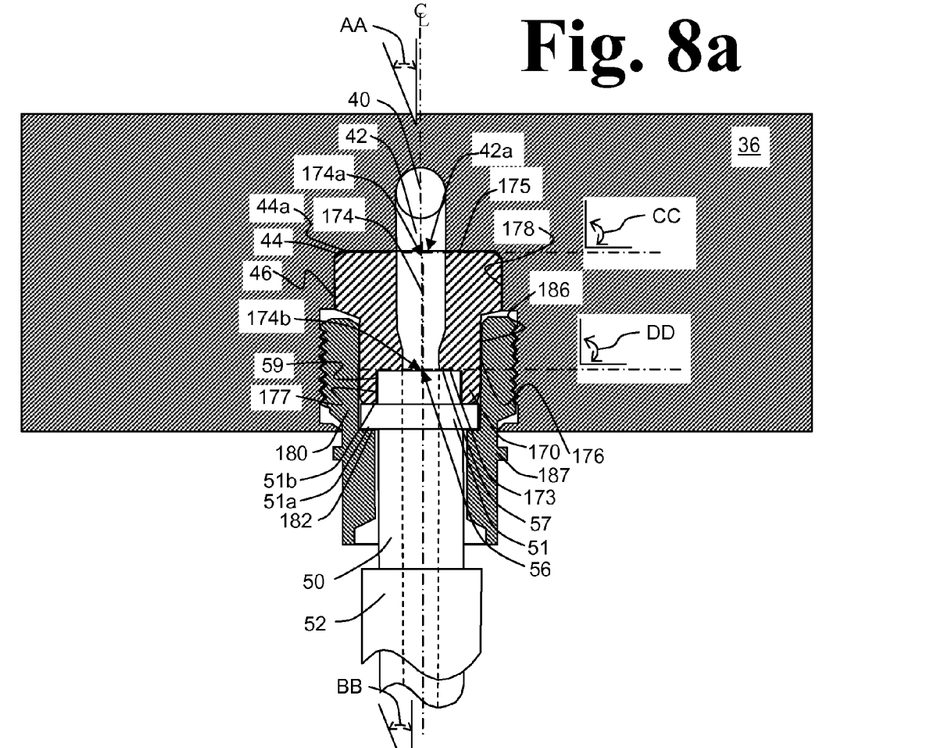
FIGS. 8a and 8b are enlarged partial cross sectional views of a further alternative of the adaptor bushing and retention device substantially similar to the invention as depicted in FIGS. 7a and 7b.
Figure 8B:
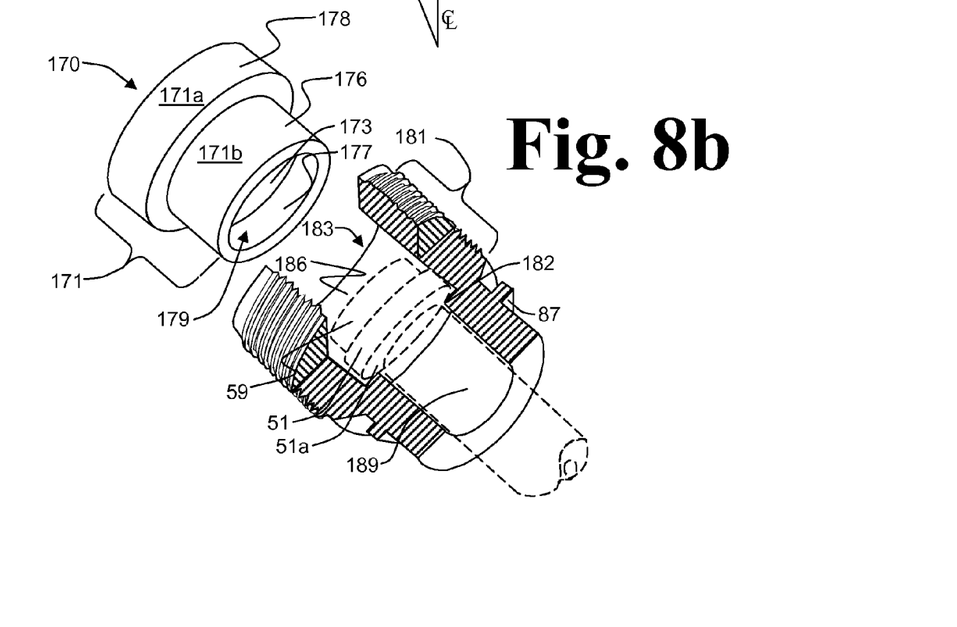
Figure 9A:
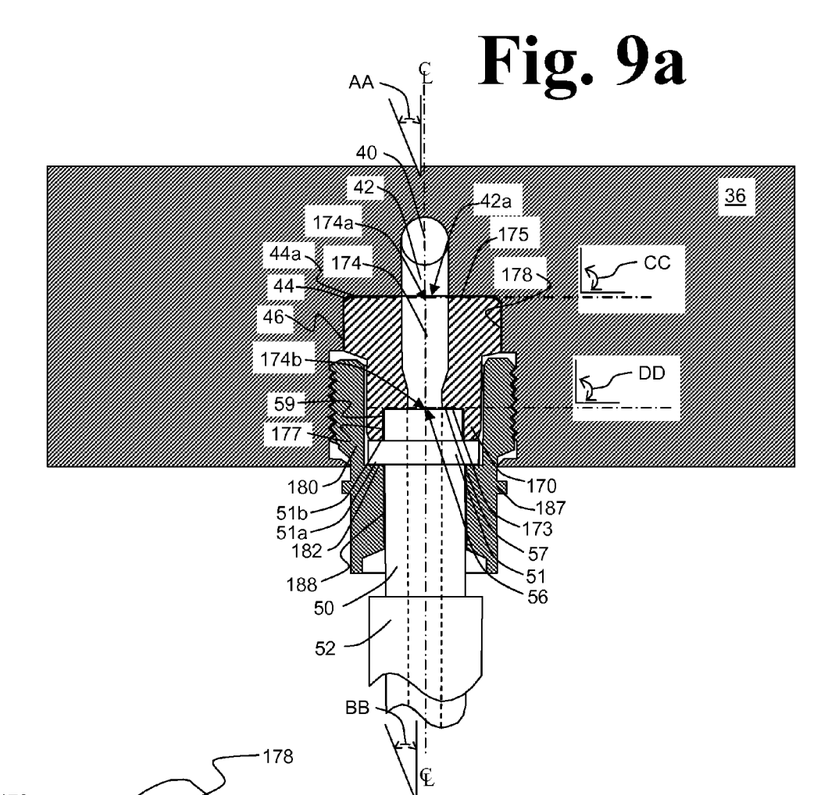
FIGS. 9a and 9b are enlarged partial cross sectional views of a further alternative of the adaptor bushing and retention device substantially similar to the invention as depicted in FIGS. 7a and 7b.
Figure 9B:
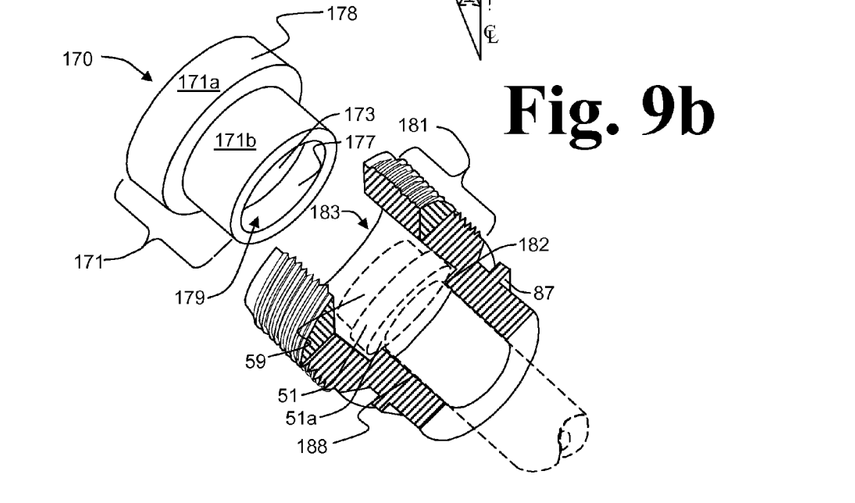

Alternative embodiments of the invention shall be described in detail with reference to the drawings: a first embodiment is illustrated in FIGS. 3, 4a and 4b; a second embodiment is illustrated in FIGS. 5a and 5b; a third embodiment is illustrated in FIGS. 6a and 6b; a fourth embodiment is illustrated in FIGS. 7a and 7b; a fifth embodiment is illustrated in FIGS. 8a and 8b; and, a sixth embodiment is illustrated in FIGS. 9a and 9b.

Referring to FIGS. 3, 4a and 4b, particular aspects of the arrangement of adaptor bushing 70, retaining nut 80 and nozzle assembly 38 of FIG. 3 and effective for retention and alignment of adaptor bushing 70 and nozzle assembly 38 with manifold block 36 will be described. In FIG. 4b, a portion of nozzle body 50 is shown in phantom (dashed lines). Internal shoulder 82 of nozzle retaining nut 80 engages lower external shoulder 51a defined by flange 51 comprising nozzle body 50 proximate the nozzle inlet end. External threads, such as threads 81, of nozzle retaining nut 80 engage internal threads of nozzle receiving bore 44 of manifold block 36 to effect retention of nozzle body 50 with manifold block 36. The lower end of cylindrical bushing body 71 contacts upper external shoulder 51b defined by flange 51 of nozzle body 50. With adaptor bushing 70 partially received in recess 83 of retaining nut 80 and with nozzle assembly 38 engaged by retaining nut 80, as retaining nut 80 is advanced into nozzle receiving bore 44, nozzle body 50 is advanced in the direction of communicating passage outlet 42a, and adaptor bushing 70 is brought into contact with ceiling 44a of receiving bore 44 and is clamped between manifold block 36 and nozzle assembly 38. Sealing contact of opposed surfaces of adaptor bushing 70 and manifold block 36 occurs by contact of end face 75, comprising a surface surrounding bushing inlet 74a, with ceiling 44a, comprising a surface surrounding outlet 42a of communicating passage 42. Sealing contact of opposed surfaces of adaptor bushing 70 and nozzle body 50 occurs by contact of recessed face 73, comprising a surface surrounding outlet 74b of bushing passage 74, with the inlet end face 57 of nozzle body 50, comprising a surface surrounding nozzle inlet 56. With compressive forces applied to bushing body 71 by engagement of threads of retaining nut 80 with threads of receiving bore 44 and acting in a direction parallel to the longitudinal centerline of bushing body 71, sufficient sealing contact of opposed surfaces as described is achieved under normal operating conditions to eliminate, or reduce to an acceptable extent, leakage of melt at the inlet and outlet interfaces of bushing passage 74 with, respectively, communicating passage 42 and nozzle passage 54. Advantageously, retaining nut 80 comprises external features for engagement with a tool for rotating retaining nut 80. Such tool engaging features may comprise flats indicated by projections 87 in FIGS. 4a. and 4b Continuing with reference to FIGS. 3, 4a and 4b, receiving bore 44 comprises internal alignment surface 46 comprising a sidewall of receiving bore 44. Retaining nut 80 comprises a complementary external alignment surface 84 disposed on the exterior of retaining nut 80 at a location suitable to contact internal alignment surface 46 when retaining nut 80 is advanced into receiving bore 44 to clamp adaptor bushing 70 in place. Bushing body 71 comprises nozzle receiving recess 79 to receive the inlet end of nozzle body 50. An alignment surface of bushing body 71 comprises bushing internal alignment surface 77 disposed on the sidewall of nozzle receiving recess 79 so as to contact exterior alignment surface 59 comprising the external sidewall of the projecting inlet end of nozzle body 50. Advantageously, retaining nut 80 further comprises nozzle alignment surface 88 located on the interior of retaining nut 80 below internal shoulder 82 to contact the exterior of nozzle body 50.

Continuing with reference to FIGS. 4a and 4b, with retaining nut external alignment surface 84 in contact with receiving bore internal alignment surface 46, the longitudinal centerline of retaining nut 80 is substantially parallel to, and substantially aligned with, the longitudinal centerline of communicating passage 42 of manifold block 36. By virtue of contact of the exterior of nozzle body 50 with nozzle alignment surface 88 of retaining nut 80, the longitudinal centerline of nozzle body 50 is substantially parallel to and substantially aligned with the longitudinal centerline of retaining nut 80 and, hence, the longitudinal centerline of nozzle body 50 is substantially parallel to and substantially aligned with the longitudinal centerline of communicating passage 42. Because the longitudinal centerline of nozzle passage 54 is aligned to the longitudinal centerline of nozzle body 50, alignment of the longitudinal centerline of nozzle body 50 with the longitudinal centerline of communicating passage 42 effects alignment of the longitudinal centerline of nozzle passage 54 with the longitudinal centerline of communicating passage 42. Internal sidewall 85 of retaining nut 80 provides clearance for the exterior of bushing body 71. With bushing internal alignment surface 77 in contact with exterior alignment surface 59 of the external sidewall of the projecting inlet end of nozzle body 50, the longitudinal centerline of bushing body 71 is substantially parallel to and substantially aligned with the longitudinal centerline of nozzle body 50 and, hence, the longitudinal centerline of bushing body 71 is substantially parallel to and substantially aligned with the longitudinal centerline of communicating passage 42. Because the longitudinal centerline of bushing passage 74 is substantially aligned with the longitudinal centerline of bushing body 71, alignment of the longitudinal centerline of bushing body 71 with the longitudinal centerline of communicating passage 42 effects substantial alignment of the longitudinal centerline of bushing passage 74 with the longitudinal centerline of communicating passage 42. In consequence of the foregoing described contact of alignment surfaces of receiving bore 44, retaining nut 80, bushing body 71 and exterior surfaces of nozzle body 50, with adaptor bushing 70 clamped in sealing contact with the ceiling 44a of receiving bore 44 by retaining nut 80, inlet 74a of bushing passage 74 is substantially aligned and concentric with communicating passage outlet 42a and outlet 74b of bushing passage 74 is substantially aligned and concentric with inlet 56 of nozzle passage 54, whereby melt is conveyed from manifold block 36 through adaptor bushing 70 into nozzle assembly 38 without unintended impediment by adaptor bushing 70. In further consequence of the foregoing described contact of surfaces of receiving bore 44, retaining nut 80, bushing body 71 and nozzle body 50, tilt of bushing body 71 relative to longitudinal centerlines of communicating passage 42 and nozzle passage 54 is substantially eliminated so that sealing contact is achieved between opposed surfaces at the interfaces of bushing passage 74 with communicating passage 42 and nozzle passage 54 so as to prevent unacceptable leakage of melt thereat under normal operating conditions.

A second embodiment of the invention substantially similar to the first embodiment will be described with reference to FIGS. 5a and 5b. In view of the substantial similarity of the first and second embodiments, like components of FIGS. 3, 4a, 4b, 5a and 5b bear the same reference numbers. In the second embodiment, bushing recess 79 provides clearance for the sidewall of the nozzle inlet end projection so that there is either no, or only incidental, contact between the sidewall of recess 79 and nozzle body 50. Unlike the first embodiment, adaptor bushing 70 comprises bushing external alignment surface 76 disposed on the exterior of adaptor bushing 70 at a location to engage complementary internal bushing alignment surface 86 comprising interior sidewall 85 of retaining nut 80. Advantageously, retaining nut 80 further comprises nozzle alignment surface 88 located on the interior of retaining nut 80 below internal shoulder 82 to contact the exterior of nozzle body 50.

Continuing with reference to FIGS. 5a and 5b, with retaining nut external alignment surface 84 in contact with internal alignment surface 46 of receiving bore 44, the longitudinal centerline of retaining nut 80 is substantially parallel to, and substantially aligned with, the longitudinal centerline of communicating passage 42 of manifold block 36. By virtue of contact of the exterior of nozzle body 50 with nozzle alignment surface 88 of retaining nut 80, the longitudinal centerline of nozzle body 50 is substantially parallel to and substantially aligned with the longitudinal centerline of retaining nut 80 and, hence, the longitudinal centerline of nozzle body 50 is substantially parallel to and substantially aligned with the longitudinal centerline of communicating passage 42. Because longitudinal centerline of nozzle passage 54 is aligned to longitudinal centerline of nozzle body 50, alignment of the longitudinal centerline of nozzle body 50 with the longitudinal centerline of communicating passage 42 makes the longitudinal centerline of nozzle passage 54 substantially parallel to and aligned with the longitudinal centerline of communicating passage 42. With internal bushing alignment surface 86 of retaining nut 80 in contact with bushing external alignment surface 76, the longitudinal centerline of cylindrical bushing body 71 is substantially parallel to, and substantially aligned with, the longitudinal centerline of retaining nut 80 and, hence substantially parallel to and substantially aligned with the longitudinal centerline of communicating passage 42, whereby the longitudinal centerline of bushing passage 74 is substantially parallel to and aligned with the longitudinal centerline of communicating passage 42. In consequence of the foregoing described contact of alignment surfaces of receiving bore 44, retaining nut 80, bushing body 71 and exterior surfaces of nozzle body 50, with adaptor bushing 70 clamped in contact with the ceiling 44a of receiving bore 44 by retaining nut 80, inlet 74a of bushing passage 74 is substantially aligned and concentric with the communicating passage outlet 42a and outlet 74b of bushing passage 74 is substantially aligned and concentric with inlet 56 of nozzle passage 54, whereby melt is conveyed from manifold block 36 through adaptor bushing 70 into nozzle assembly 38 without unintended impediment by adaptor bushing 70. In further consequence of the foregoing described contact of surfaces of receiving bore 44, retaining nut 80, bushing body 71 and nozzle body 50, tilt of bushing body 71 relative to longitudinal centerlines of communicating passage 42 and nozzle passage 54 is substantially eliminated so that sealing contact is achieved between surfaces at the inlet and outlet interfaces of bushing passage 74 with, respectively, communicating passage 42 and nozzle passage 54 so as to prevent unacceptable leakage of melt thereat under normal operating conditions.

A third embodiment of the invention substantially similar to the first embodiment shall be described with reference to FIGS. 6a and 6b. Unlike the first and second embodiments, retaining nut 80 of the third embodiment lacks nozzle alignment surface 88 located on the interior of retaining nut 80 below internal shoulder 82 and the internal sidewall 89 of retaining nut 80 provides clearance for nozzle body 50 below shoulder 82 so that there is no, or only incidental contact with nozzle body 50 and sidewall 89. Similarly to the second embodiment, adaptor bushing 70 comprises bushing external alignment surface 76 disposed on the exterior of adaptor bushing 70 at a location to contact complementary internal bushing alignment surface 86 comprising interior sidewall 85 of retaining nut 80. Similarly to the first embodiment, in the third embodiment, receiving recess 79 of bushing body 71 comprises internal alignment surface 77 disposed on the sidewall of nozzle receiving recess 79 so as to contact exterior alignment surface 59 comprising the external sidewall of the projecting inlet end of nozzle body 50. With retaining nut external alignment surface 84 in contact with internal alignment surface 46 of receiving bore 44, the longitudinal centerline of retaining nut 80 is substantially parallel to, and substantially aligned with, the longitudinal centerline of communicating passage 42 of manifold block 36. With internal bushing alignment surface 86 of retaining nut 80 in contact with bushing external alignment surface 76, the longitudinal centerline of cylindrical bushing body 71 is substantially parallel to, and substantially aligned with, the longitudinal centerline of retaining nut 80 and, hence substantially parallel to and substantially aligned with the longitudinal centerline of communicating passage 42, whereby the longitudinal centerline of bushing passage 74 is substantially parallel to and aligned with the longitudinal centerline of communicating passage 42. By virtue of contact of the exterior alignment surface 59 of the projecting inlet end of nozzle body 50 with alignment surface 77 of recess 79 of adaptor bushing 70, the longitudinal centerline of nozzle body 50 is substantially parallel to and substantially aligned with the longitudinal centerline of adaptor bushing 70 and, hence, the longitudinal centerline of nozzle body 50 is substantially parallel to and substantially aligned with the longitudinal centerline of communicating passage 42. Because longitudinal centerline of nozzle passage 54 is aligned to longitudinal centerline of nozzle body 50, alignment of the longitudinal centerline of nozzle body 50 with the longitudinal centerline of communicating passage 42 makes the longitudinal centerline of nozzle passage 54 substantially parallel to and aligned with the longitudinal centerline of communicating passage 42. In consequence of the foregoing described contact of alignment surfaces of receiving bore 44, retaining nut 80, bushing body 71 and exterior surfaces of nozzle body 50, with adaptor bushing 70 clamped in contact with ceiling 44a of receiving bore 44 by retaining nut 80, inlet 74a of bushing passage 74 is substantially aligned and concentric with communicating passage outlet 42a and outlet 74b of bushing passage 74 is substantially aligned and concentric with inlet 56 of nozzle passage 54, whereby melt is conveyed from manifold block 36 through adaptor bushing 70 into nozzle assembly 38 without unintended impediment by adaptor bushing 70. In further consequence of the foregoing described contact of surfaces of receiving bore 44, retaining nut 80, bushing body 71 and nozzle body 50, tilt of bushing body 71 relative to longitudinal centerlines of ceiling 44a and nozzle body 50 is substantially eliminated so that sealing contact is achieved between surfaces at the inlet and outlet interfaces of bushing passage 74 with, respectively, communicating passage 42 and nozzle passage 54 so as to prevent unacceptable leakage of melt thereat under normal operating conditions.

Referring to FIGS. 7a and 7b, particular aspects of a fourth embodiment of the arrangement of an adaptor bushing, retention device and nozzle assembly effective for retention and alignment of an adaptor bushing and nozzle assembly with manifold block 36 will be described. In FIG. 7b, a portion of nozzle body 50 is shown in phantom (dashed lines). As in the first three embodiments, communicating passage 42 terminates in outlet 42a at ceiling 44a of receiving bore 44. The inlet end of nozzle assembly 38 is partially received in receiving bore 44 and adaptor bushing 170 is interposed between manifold block 36 and nozzle assembly 38. Internal shoulder 182 of nozzle retaining nut 180 engages lower external shoulder 51a comprising nozzle body 50 on the nozzle outlet side of nozzle body flange 51. External threads, such as threads 181, of nozzle retaining nut 180 engage internal threads of nozzle receiving bore 44 of manifold block 36 to retain nozzle body 50 with manifold block 36. Adaptor bushing 170 is partially received within recess 183 of retaining nut 180 and extends outward therefrom within receiving bore 44 when retaining nut 180 is engaged with manifold block 36. The outlet end of adaptor bushing 170 contacts upper external shoulder 51b on the nozzle inlet side of nozzle body flange 51. With nozzle assembly 38 engaged by retaining nut 180 and adaptor bushing 170 partially received in recess 183 of retaining nut 180, as retaining nut 180 is advanced into receiving bore 44, adaptor bushing 170 is brought into contact with manifold block 36 and is clamped between manifold block 36 and nozzle assembly 38.

Continuing with reference to FIGS. 7a and 7b, as in the second embodiment, bushing recess 179 provides clearance for the sidewall of the nozzle inlet end projection so that there is either no, or only incidental, contact between the sidewall of bushing recess 179 and nozzle body 50. Sealing contact of opposed surfaces of manifold block 36 and bushing body 171 occurs by contact of end face 175, comprising a surface surrounding bushing inlet 174a, with ceiling 44a comprising a surface surrounding the communicating passage outlet 42a. Sealing contact of opposed surfaces of bushing body 171 and nozzle body 50 occurs by contact of recessed face 173 comprising a surface surrounding outlet 174b of bushing passage 174 with the inlet end face 57 of nozzle body 50 comprising a surface surrounding nozzle inlet 56. With compressive forces effected by engagement of retaining nut 180 with receiving bore 44 and acting parallel to the longitudinal centerline of bushing body 170, sufficient sealing contact is achieved, under normal operating conditions, to eliminate, or reduce to an acceptable extent, leakage of melt at the inlet and outlet interfaces of bushing passage 174 with, respectively communicating passage 42 and nozzle passage 54. Advantageously, retaining nut 180 comprises external features for engagement with a tool for rotating retaining nut 180. Such features may comprise flats indicated by projections 187 in FIG. 7a.

Continuing with reference to FIGS. 7a and 7b, receiving bore 44 comprises internal alignment surface 46 comprising a sidewall of receiving bore 44. Adaptor bushing 170 comprises a complementary first alignment surface 178 comprising an alignment surface of bushing body 171 and disposed on the exterior of enlarged cylindrical head segment 171a at a location suitable to contact internal alignment surface 46 when adaptor bushing 170 is seated against the ceiling 44a of receiving bore 44. Adaptor bushing 170 comprises second bushing alignment surface 176 disposed on the exterior of cylindrical trunk segment 171b of bushing body 171 at a location to engage complementary internal bushing alignment surface 186 located on the interior sidewall of recess 183 of retaining nut 180. Retaining nut 180 further comprises nozzle alignment surface 188 located on the interior of retaining nut 180 below internal shoulder 182 to contact the exterior of nozzle body 50 on the nozzle outlet end side of flange 51.

Continuing with reference to FIGS. 7a and 7b, with bushing first alignment surface 178 in contact with receiving bore internal alignment surface 46, the longitudinal centerline of bushing body 171 is substantially parallel to, and substantially aligned with, the longitudinal centerline of communicating passage 42 of manifold block 36. Because the longitudinal centerline of bushing passage 174 is substantially aligned with the longitudinal centerline of bushing body 171, alignment of the longitudinal centerline of bushing body 171 with the longitudinal centerline of communicating passage 42 makes the longitudinal centerline of bushing passage 174 substantially parallel to and aligned with the longitudinal centerline of communicating passage 42. That alignment is effective to dispose inlet 174a to be concentric with the communicating passage outlet 42a. With internal bushing alignment surface 186 of retaining nut 180 in contact with bushing second alignment surface 176, the longitudinal centerline of retaining nut 180 is substantially parallel to, and substantially aligned with, the longitudinal centerline of bushing body 171. With nozzle body 50 in contact with nozzle alignment surface 188 of retaining nut 180, the longitudinal centerline of nozzle body 50 is substantially parallel to, and substantially aligned with, the longitudinal centerline of retaining nut 180. Because the longitudinal centerline of nozzle passage 54 is substantially aligned with the longitudinal centerline of nozzle body 50, substantial alignment of the longitudinal centerline of nozzle body 50 with the longitudinal centerline of retaining nut 180 is effective to make the longitudinal centerline of nozzle passage 54 substantially parallel to and aligned with the longitudinal centerline of adaptor bushing 170 and substantially parallel to and aligned with the longitudinal centerline of bushing passage 174. In consequence of that alignment, inlet 56 of nozzle body 50 is substantially concentric with outlet 174b of bushing passage 174. In consequence of the foregoing described contact of alignment surfaces of receiving bore 44, retaining nut 180, bushing body 171 and exterior surfaces of nozzle body 50, with adaptor bushing 170 clamped in contact with ceiling 44a of receiving bore 44 by retaining nut 180, inlet 174a of bushing passage 174 is substantially aligned and concentric with the communicating passage outlet 42a and outlet 174b of bushing passage 74 is substantially aligned and concentric with inlet 56 of nozzle passage 54, whereby melt is conveyed from manifold block 36 through adaptor bushing 170 into nozzle assembly 38 without unintended impediment by adaptor bushing 170. In further consequence of the foregoing described contact of surfaces of receiving bore 44, bushing body 171, retaining nut 180 and nozzle body 50, tilt of bushing body 171 relative to longitudinal centerlines of communicating passage 42 and nozzle body 50 is substantially eliminated so that sealing contact is achieved between opposed surfaces at the inlet and outlet interfaces of bushing passage 174 with communicating passage 42 and nozzle passage 54 so as to prevent unacceptable leakage of melt thereat under normal operating conditions.

A fifth embodiment of the invention substantially similar to the fourth embodiment shall be described with reference to FIGS. 8a and 8b. Unlike the fourth embodiment of the invention, retaining nut 180 of the fifth embodiment lacks nozzle alignment surface 188 located on the interior of retaining nut 180 below internal shoulder 182 and the internal sidewall 189 of retaining nut 180 provides clearance for nozzle body 50 below shoulder 182 so that there is no, or only incidental contact with nozzle body 50 and sidewall 189 of retaining nut 180. Similarly to the fourth embodiment, adaptor bushing 170 comprises second bushing external alignment surface 176 disposed on the exterior of the trunk 171b of adaptor bushing 170 at a location to contact complementary internal bushing alignment surface 186 comprising interior sidewall 185 of retaining nut 180. In the fifth embodiment, receiving recess 179 of bushing body 171 comprises internal alignment surface 177 disposed on the sidewall of nozzle receiving recess 179 so as to contact exterior alignment surface 59 comprising the external sidewall of the projecting inlet end of nozzle body 50. With adaptor bushing external alignment surface 178 in contact with internal alignment surface 46 of receiving bore 44, the longitudinal centerline of adaptor bushing 170 is substantially parallel to, and substantially aligned with, the longitudinal centerline of communicating passage 42 of manifold block 36. Because the longitudinal centerline of bushing passage 174 is substantially aligned with the longitudinal centerline of bushing body 171, alignment of the longitudinal centerline of bushing body 171 with the longitudinal centerline of communicating passage 42 makes the longitudinal centerline of bushing passage 174 substantially parallel to and aligned with the longitudinal centerline of communicating passage 42. With internal bushing alignment surface 186 of retaining nut 180 in contact with bushing external alignment surface 176, the longitudinal centerline of retaining nut 180 is substantially parallel to, and substantially aligned with, the longitudinal centerline of bushing body 171 and, hence substantially parallel to and substantially aligned with the longitudinal centerline of communicating passage 42. By virtue of contact of the exterior alignment surface 59 of the projecting inlet end of nozzle body 50 with alignment surface 177 of recess 179 of adaptor bushing 170, the longitudinal centerline of nozzle body 50 is substantially parallel to and substantially aligned with the longitudinal centerline of adaptor bushing 170 and, hence, the longitudinal centerline of nozzle body 50 is substantially parallel to and substantially aligned with the longitudinal centerline of communicating passage 42. Because longitudinal centerline of nozzle passage 54 is aligned to longitudinal centerline of nozzle body 50, alignment of the longitudinal centerline of nozzle body 50 with the longitudinal centerline of communicating passage 42 makes the longitudinal centerline of nozzle passage 54 substantially parallel to and aligned with the longitudinal centerline of communicating passage 42. In consequence of the foregoing described contact of alignment surfaces of receiving bore 44, bushing body 171, retaining nut 180 and exterior surfaces of nozzle body 50, with adaptor bushing 170 clamped in contact with the ceiling 44a of receiving bore 44 by retaining nut 180, inlet 174a of bushing passage 174 is substantially aligned and concentric with the communicating passage outlet 42a and outlet 174b of bushing passage 174 is substantially aligned and concentric with inlet 56 of nozzle passage 54, whereby melt is conveyed from manifold block 36 through adaptor bushing 170 into nozzle assembly 38 without unintended impediment by adaptor bushing 170. In further consequence of the foregoing described contact of surfaces of receiving bore 44, bushing body 171, retaining nut 180 and nozzle body 50, tilt of bushing body 171 relative to longitudinal centerlines of communicating passage 42 and nozzle body 50 is substantially eliminated so that sealing contact is achieved between surfaces at the inlet and outlet interfaces of bushing passage 174 with, respectively, communicating passage 42 and nozzle passage 54 so as to prevent unacceptable leakage of melt thereat under normal operating conditions.

A sixth embodiment of the invention substantially similar to the fourth embodiment shall be described with reference to FIGS. 9a and 9b. Similarly to the fourth embodiment of the invention, retaining nut 180 of the fifth embodiment comprises nozzle alignment surface 188 located on the interior of retaining nut 180 below internal shoulder 182 so as to be disposed to contact nozzle body 50. Unlike the fourth embodiment, in the sixth embodiment adaptor bushing 170 lacks second bushing external alignment surface 176 and retaining nut 180 lacks complementary internal bushing alignment surface 186. Rather, recess 183 of retaining nut 180 provides clearance for the external sidewall of trunk 171b of bushing body 171 so that there is no, or only incidental, contact between that sidewall of bushing body 171 and the internal sidewall of recess 183. In the sixth embodiment, receiving recess 179 of bushing body 171 comprises internal alignment surface 177 disposed on the sidewall of nozzle receiving recess 179 so as to contact exterior alignment surface 59 comprising the external sidewall of the projecting inlet end of nozzle body 50. With adaptor bushing external alignment surface 178 in contact with internal alignment surface 46 of receiving bore 44, the longitudinal centerline of adaptor bushing 170 is substantially parallel to, and substantially aligned with, the longitudinal centerline of communicating passage 42 of manifold block 36. Because the longitudinal centerline of bushing passage 174 is substantially aligned with the longitudinal centerline of bushing body 171, alignment of the longitudinal centerline of bushing body 171 with the longitudinal centerline of communicating passage 42 makes the longitudinal centerline of bushing passage 174 substantially parallel to and aligned with the longitudinal centerline of communicating passage 42. By virtue of contact of the exterior alignment surface 59 of the projecting inlet end of nozzle body 50 with alignment surface 177 of recess 179 of adaptor bushing 170, the longitudinal centerline of nozzle body 50 is substantially parallel to and substantially aligned with the longitudinal centerline of adaptor bushing 170 and, hence, the longitudinal centerline of nozzle body 50 is substantially parallel to and substantially aligned with the longitudinal centerline of communicating passage 42. Because longitudinal centerline of nozzle passage 54 is aligned to longitudinal centerline of nozzle body 50, alignment of the longitudinal centerline of nozzle body 50 with the longitudinal centerline of communicating passage 42 makes the longitudinal centerline of nozzle passage 54 substantially parallel to and aligned with the longitudinal centerline of communicating passage 42. With internal nozzle alignment surface 188 of retaining nut 180 in contact with nozzle body 50, the longitudinal centerline of retaining nut 180 is made substantially parallel to and aligned with the longitudinal centerline of nozzle body 50 and, hence substantially parallel to and substantially aligned with the longitudinal centerline of communicating passage 42. In consequence of the foregoing described contact of alignment surfaces of receiving bore 44, bushing body 171, retaining nut 180 and exterior surfaces of nozzle body 50, with adaptor bushing 170 clamped in contact with the ceiling 44a of receiving bore 44 by retaining nut 180, inlet 174a of bushing passage 174 is substantially aligned and concentric with the communicating passage outlet 42a and outlet 174b of bushing passage 174 is substantially aligned and concentric with inlet 56 of nozzle passage 54, whereby melt is conveyed from manifold block 36 through adaptor bushing 170 into nozzle assembly 38 without unintended impediment by adaptor bushing 170. In further consequence of the foregoing described contact of surfaces of receiving bore 44, bushing body 171, retaining nut 180 and nozzle body 50, tilt of bushing body 171 relative to longitudinal centerlines of communicating passage 42 and nozzle body 50 is substantially eliminated so that sealing contact is achieved between surfaces at the inlet and outlet interfaces of bushing passage 174 with, respectively, communicating passage 42 and nozzle passage 54 so as to prevent unacceptable leakage of melt thereat under normal operating conditions.

Figures 10A, 10B:
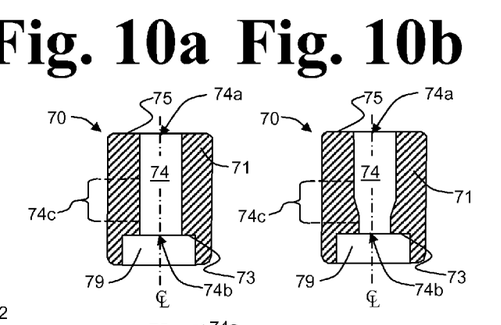
FIGS. 10a, 10b, and 10c are cross sectional views of an adaptor bushing in accordance with the invention and illustrating alterative transition regions thereof.
Figure 10C:
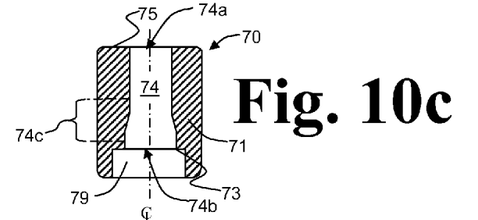

Three styles of adaptor bushing transition regions are illustrated in FIGS. 10a, 10b, and 10c. Although shown as applied to adaptor bushing 70 of FIGS. 3, 4a, 4b, 5a, 6a and 6b, corresponding transition regions as illustrated would be suitable for use with adaptor bushing 170 of FIGS. 7a, 7b, 8a, 8b, 9a and 9b. In FIG. 10a, bushing passage 74, including transition region 74c, is of constant cross sectional size between bushing inlet 74a and bushing outlet 74b. Adaptor bushings having passages of constant cross sectional size are suitable for connecting a communicating passage outlet and nozzle inlet of the same cross sectional size. FIG. 10b illustrates a bushing passage comprising a transition region 74c to a relatively smaller cross sectional size at bushing outlet 74b. Adaptor bushings comprising a transition region 74c as illustrated in FIG. 10b are suitable for connecting a communicating passage outlet and nozzle inlet where the nozzle inlet has a smaller cross sectional size than the communicating passage outlet. FIG. 10c illustrates a bushing passage comprising a transition region 74c to a relatively larger cross sectional size at the bushing outlet 74b. Adaptor bushings comprising a transition region as illustrated in FIG. 10c are suitable for connecting a communicating passage and nozzle inlet where the nozzle inlet has a larger cross sectional size than the communicating passage. While no passage cross sectional size adaptation is required where a communicating passage outlet size is the same as a nozzle passage inlet size, bushings according to FIG. 10a permit use of a common retaining nut such as retaining nut 80 for attachment of all nozzle assemblies to a manifold block irrespective of the need for passage cross sectional size adaptation, hence reducing the number of different components required to create manifold and nozzle assembly constructions.

It will be appreciated that for a particular size of receiving bore, there is an upper limit to the cross sectional size of bushing passages that can be accommodated. Hence, that upper limit determines a range of cross sectional sizes of nozzle passage inlets that can be accommodated for a particular cross sectional size of receiving bore. Beyond that limit, a manifold having receiving bores of larger cross section are required. Nevertheless, the invention is effective to permit the use of manifolds having receiving bores of a particular cross sectional size with nozzles having nozzle passage inlets of cross sectional size falling within the range that can be accommodated by suitable adaptor bushings. Hence, nozzle assemblies for nozzle melt passages of differing sizes within the range can be used with a manifold having a particular receiving bore cross sectional size.

What is claimed is:

1. An adaptor bushing for use in an injection molding apparatus said injection molding apparatus comprising a material distributing manifold, at least one nozzle assembly and at least one nozzle retention device for threadably retaining a nozzle body comprising the nozzle assembly with the material distributing manifold, the nozzle retention device effective to clamp the adaptor bushing between the material distributing manifold and the nozzle assembly, the adaptor bushing comprising: a bushing passage for fluid communication between a communicating passage comprising a passage of the material distributing manifold and a nozzle passage comprising the nozzle assembly; at least one transition region joining portions of the bushing passage; and, at least one alignment surface effective for achieving alignment of the adaptor bushing to effect concentricity of the inlet and outlet of the bushing passage with, respectively, the outlet of the communicating passage and the inlet of the nozzle passage and to prevent, under normal operating conditions, leakage of material at the bushing inlet and outlet interfaces with, respectively the communicating passage and nozzle passage, and wherein one of the adaptor bushing and the retention device comprises alignment surfaces to align the longitudinal centerline of the nozzle passage with the longitudinal centerline of the bushing passage.

2. The adaptor bushing according to claim 1 wherein the adaptor bushing is partially received within a recess of the nozzle retention device, the retention device is threadably engaged with a receiving bore of the material distributing manifold, the communicating passage terminates at the receiving bore, alignment surfaces of the retention device and receiving bore are effective to make the longitudinal centerline of the retention device substantially parallel to and aligned with the longitudinal centerline of the communicating passage, an alignment surface of the retention device is effective to align the longitudinal centerline of the nozzle passage with the longitudinal centerline of the retention device and the at least one alignment surface of the adaptor bushing is disposed to contact an alignment surface comprising the recess of the nozzle retention device in which the adaptor bushing is partially received so that the longitudinal centerline of the bushing passage is made substantially parallel to and aligned with the longitudinal centerline of the retention device, whereby the longitudinal centerline of the bushing passage is made substantially parallel to and aligned with the longitudinal centerline of the communicating passage when the nozzle retention device clamps the adaptor bushing between the nozzle assembly and material distributing manifold.

3. The adaptor bushing according to claim 1 wherein the adaptor bushing is partially received within a recess of the nozzle retention device, the retention device is threadably engaged with a receiving bore of the material distributing manifold, the communicating passage terminates at the receiving bore, alignment surfaces of the retention device and receiving bore are effective to make the longitudinal centerline of the retention device substantially parallel to and aligned with the longitudinal centerline of the communicating passage, an alignment surface of adaptor bushing is effective to align the longitudinal centerline of the nozzle passage with the longitudinal centerline of the adaptor bushing and the at least one alignment surface of the adaptor bushing is disposed to contact an alignment surface comprising the recess of the nozzle retention device in which the adaptor bushing is partially received so that the longitudinal centerline of the bushing passage is made substantially parallel to and aligned with the longitudinal centerline of the retention device, whereby the longitudinal centerline of the bushing passage is made substantially parallel to and aligned with the longitudinal centerline of the communicating passage when the nozzle retention device clamps the adaptor bushing between the nozzle assembly and material distributing manifold.

4. The adaptor bushing according to claim 1 wherein the adaptor bushing is partially received within a recess of the nozzle retention device, the retention device is threadably engaged with a receiving bore of the material distributing manifold, the communicating passage terminates at the receiving bore, an alignment surface of the retention device is effective to align the longitudinal centerline of the nozzle passage with the longitudinal centerline of the retention device and alignment surfaces of the retention device and receiving bore are effective to achieve substantial parallelism and alignment of the longitudinal centerline of the retention device with the longitudinal centerline of the communicating passage, the at least one alignment surface of the adaptor bushing is disposed to contact the inlet end of the nozzle body so that the longitudinal centerline of the bushing passage is made substantially parallel to and aligned with the longitudinal centerline of the nozzle passage when the adaptor bushing is clamped between the nozzle assembly and the material distributing manifold, whereby the longitudinal centerline of the bushing passage is made substantially parallel to and in alignment with the longitudinal centerline of the communicating passage.

5. The adaptor bushing according to claim 1 wherein the adaptor bushing is partially received within a recess of the nozzle retention device, the nozzle retention device is threadably engaged with a receiving bore of the material distributing manifold, the communicating passage terminates at the receiving bore and the adaptor bushing further comprises an enlarged head segment received within the receiving bore and the at least one external alignment surface comprises a first alignment surface disposed on the exterior of the enlarged head segment to contact an internal alignment surface on the sidewall of the receiving bore so that the longitudinal centerline of the bushing passage is made substantially parallel to and aligned with the longitudinal centerline of the communicating passage by contact between the first alignment surface of the adaptor bushing with the internal alignment surface of the receiving bore and an alignment surface of the adaptor bushing is disposed to contact the inlet end of the nozzle body so that the longitudinal centerline of the nozzle passage is aligned with the longitudinal centerline of the communicating passage.

6. The adaptor bushing according to claim 1 wherein the adaptor bushing is partially received within a recess of the nozzle retention device, the nozzle retention device is threadably engaged with a receiving bore of the material distributing manifold, the communicating passage terminates at the receiving bore and the adaptor bushing further comprises an enlarged head segment received within the receiving bore and the at least one external alignment surface comprises a first alignment surface disposed on the exterior of the enlarged head segment to contact an internal alignment surface on the sidewall of the receiving bore so that the longitudinal centerline of the bushing passage is made substantially parallel to and aligned with the longitudinal centerline of the communicating passage by contact between the first alignment surface of the adaptor bushing with the internal alignment surface of the receiving bore and an alignment surface of the retention device is disposed to contact the nozzle body so that the longitudinal centerline of the nozzle passage is aligned with the longitudinal centerline of the communicating passage.

7. The adaptor bushing according to claim 5 wherein the adaptor bushing further comprises a second alignment surface disposed on a trunk segment of the adaptor bushing disposed to contact an alignment surface of the recess of the nozzle retention device so that the longitudinal centerline of the nozzle retention device is made parallel to and is aligned with the longitudinal centerline of the bushing passage by contact between the second alignment surface with the alignment surface of the recess of the nozzle retention device whereby the longitudinal centerline of the nozzle passage is made substantially parallel to and aligned with the longitudinal centerline of the communicating passage.

8. An apparatus for injection molding comprising:
a) at least one manifold member comprising at least one manifold passage for conveying material in a flowable condition received from an injection unit;
b) at least one nozzle assembly comprising an elongated cylindrical nozzle body having a nozzle passage there through for conveying said material in a flowable condition received from a manifold to an inlet of a mold cavity, the nozzle passage joining a nozzle inlet with a nozzle outlet;
c) at least one retention device, each retention device threadably retaining one of the nozzle assemblies with the manifold member; and,
d) at least one adaptor bushing, each adaptor bushing being interposed between a nozzle assembly retained by a retention device and the manifold member and comprising a bushing passage in fluid communication with the manifold passage and the nozzle passage, each adaptor bushing being clamped between the manifold member and nozzle assembly by the retention device.

9. The apparatus according to claim 8 wherein the manifold comprises at least one cylindrical receiving bore for receiving the inlet end of said nozzle assembly and the manifold passage comprises a communicating passage in fluid communication with the manifold passage and terminating at the receiving bore.

10. The apparatus according to claim 9 wherein the adaptor bushing is received within the receiving bore and is clamped in sealing contact with the nozzle body and with the ceiling of the receiving bore by the retention device so as to eliminate, under normal operating conditions leakage of said material at the interfaces of the inlet and outlet of the bushing passage with, respectively, the communicating passage and the inlet of the nozzle passage.

11. The apparatus according to claim 10 wherein the retention device comprises external threads for engaging threads on the sidewall of the receiving bore so that rotation of the retention device in one direction is effective to advance the inlet end of the nozzle assembly within the receiving bore toward the ceiling thereof.

12. The apparatus according to claim 8 wherein the bushing passage comprises at least one transition region joining portions of the bushing passage.

13. The apparatus according to claim 12 wherein the transition region joins a cross sectional size of the inlet of the bushing passage that is larger than the cross sectional size of the portion of the bushing passage joined by the transition region.

14. The apparatus according to claim 12 wherein the transition region joins a cross sectional size of the inlet of the bushing passage that is smaller than the cross sectional size of the portion of the bushing passage joined by the transition region.

15. The apparatus according to claim 9 wherein the receiving bore, retention device and adaptor bushing comprise alignment surfaces effective to achieve substantial parallelism and alignment of the longitudinal centerlines of the adaptor bushing, the nozzle assembly and the communicating passage.

16. The apparatus according to claim 15 wherein the retention device further comprises a nozzle alignment surface disposed to contact a portion of the exterior of the nozzle body so as to effect substantial parallelism and alignment of the longitudinal centerline of the nozzle body with the longitudinal centerline of the retention device and the longitudinal centerline of the retention device is held in substantial parallelism to and alignment with the longitudinal centerline of the communicating passage in consequence of contact of alignment surfaces of the retention device and receiving bore.

17. The apparatus according to claim 16 wherein substantial parallelism and alignment of the longitudinal centerline of the adaptor bushing with the longitudinal centerline of the communicating passage is effected by contact of external alignment surfaces of the adaptor bushing with internal alignment surfaces of the retention device.

18. The apparatus according to claim 16 wherein substantial parallelism and alignment of the longitudinal centerline of the adaptor bushing with the longitudinal centerline of the communicating passage is effected by contact of an internal alignment surface of the adaptor bushing with an external alignment surface of the projecting inlet end of the nozzle body.

19. The apparatus according to claim 15 wherein the adaptor bushing further comprises an alignment surface disposed to contact a complementary alignment surface of the inlet end of the nozzle body so as to effect substantial parallelism and alignment of the longitudinal centerline of the nozzle body with the longitudinal centerline of the adaptor bushing and the longitudinal centerline of the adaptor bushing is held in substantial parallelism to and alignment with the longitudinal centerline of the communicating passage in consequence of contact of alignment surfaces of the adaptor bushing and receiving bore.

20. The apparatus according to claim 15 wherein the retention device further comprises a nozzle alignment surface disposed to contact a portion of the exterior of the nozzle body so as to effect substantial parallelism and alignment of the longitudinal centerline of the nozzle body with the longitudinal centerline of the retention device, the body of the adaptor bushing further comprises first and second external alignment surfaces and the longitudinal centerline of the bushing body is made substantially parallel to and aligned with the longitudinal centerline of the communicating passage by contact of the first external alignment surface of the bushing body with an internal alignment surface of the receiving bore and the longitudinal centerline of the retention device is made substantially parallel to and aligned with the longitudinal centerline of the adaptor bushing by contact of the second external alignment surface of the bushing body with an internal alignment surface of the retention device.

* * * * *